United States Patent [19]
Martin et al.

[11] 4,293,480
[45] Oct. 6, 1981

[54] URETHANE BINDER COMPOSITIONS FOR NO-BAKE AND COLD BOX FOUNDRY APPLICATION UTILIZING ISOCYANATO-URETHANE POLYMERS

[75] Inventors: Ralph D. Martin; William R. Dunnavant, both of Columbus; Gregory P. Sturtz, Worthington; Heimo J. Langer, Columbus, all of Ohio

[73] Assignee: Ashland Oil, Inc., Ashland, Ky.

[21] Appl. No.: 38,158

[22] Filed: May 11, 1979

[51] Int. Cl.$^3$ .................. C08L 61/10; C08L 75/08
[52] U.S. Cl. ..................... 260/38; 260/37 N; 525/456
[58] Field of Search ................. 525/456, 453; 260/DIG. 40, 38, 37 N; 264/219, DIG. 77; 106/38.25; 164/43

[56] References Cited

U.S. PATENT DOCUMENTS

| | | | |
|---|---|---|---|
| 3,409,579 | 11/1968 | Robins | 525/502 |
| 3,702,316 | 11/1972 | Robins | 260/DIG. 40 |
| 3,726,867 | 4/1973 | Robins | 260/DIG. 40 |
| 4,179,427 | 12/1979 | Gardikes | 260/38 |

Primary Examiner—Theodore E. Pertilla
Attorney, Agent, or Firm—T. Gene Dillahunty; Vernon F. Venne; William Kammerer

[57] ABSTRACT

Foundry cores and molds for casting metals are prepared by forming a binder comprising a polyol, an isocyanato urethane polymer and a urethane catalyst. The foundry cores and molds of this invention are formed by processes known in the industry as the "cold box" process and the no-bake process. The binder is especially useful for casting non-ferrous metals, for example, the casting of aluminum, magnesium and other lightweight metals. The cores and molds produced for casting aluminum and other lightweight metals exhibit excellent shakeout while retaining other desirable core and mold properties.

24 Claims, No Drawings

URETHANE BINDER COMPOSITIONS FOR NO-BAKE AND COLD BOX FOUNDRY APPLICATION UTILIZING ISOCYANATO-URETHANE POLYMERS

BACKGROUND OF THE INVENTION

This invention relates to resinous binder compositions which are admixtures of polyols and isocyanate urethane polymers. These compositions may be cured by known urethane catalysts including a gaseous catalyst. In another aspect this invention relates to curable urethane binder compositions which are useful for binding particulate solids. In particular the invention relates to urethane binders of the no bake and of the cold box type, which utilize an isocyanato urethane polymer as an isocyanate reactant or component. The binders are capable of bonding sand or other foundry aggregate to form molds or cores for casting of metals, especially aluminum and other lightweight metals which are cast at relatively low temperature. The cores and molds made using these binders demonstrate superior collapsibility or shakeout when used at low casting temperatures.

DESCRIPTION OF THE PRIOR ART

Urethane cold box binders for use in bonding aggregates useful as foundry cores and molds known in the art. U.S. Pat. No. 3,409,579 is an example of such a cold box binder composition and the use thereof to make cores and molds for foundry applications.

Further, urethane no bake binders for use in bonding aggregates useful as foundry cores and molds are known in the art. U.S. Pat. No. 3,676,392 is an example of such a no bake binder composition and the use thereof to make cores and molds for foundry applications.

A long felt need in the foundry industry has been a no bake and a cold box binder useful in forming cores and molds for casting light metals such as aluminum and magnesium. The no bake and cold box binders of the prior art were unable to provide cores and molds for casting these lightweight metals having the required core and mold properties as well as good shakeout. When enough binder is used to achieve workable strength and abrasion resistance the cores and molds would not break down well at the casting temperatures of light metals. That is, they exhibited poor shakeout. An existing problem encountered in casting light weight metals has been to find a binder that on the one hand produced strong, non-friable cores and molds and on the other hand, broke down well at the casting temperature of aluminum and magnesium to provide easy shakeout.

BRIEF SUMMARY OF THE INVENTION

It is an object of this invention to provide a foundry urethane binder composition using in admixture a polyol component and a polyisocyanate component, wherein the polyisocyanate component is an isocyanato urethane polymer formed by combining a polyol and a polyisocyanate. The mixture may be cured with a gaseous catalyst or with other urethane catalysts. For reasons of clarity the term "polyhydroxy compound" will be used to describe the polyol reactant in the formation of an isocyanato urethane polymer. The term "polyol" will apply to the reactant, also referred to as Part I, associated with the reaction in which the foundry binder is formed. It will be understood that "polyhydroxy compound" and "polyol" encompass the same class of chemical compounds.

It is further an object of this invention to provide urethane no bake and cold box binders which can be used to produce sand cores and molds which have strength and non-friability but still break down well at low casting temperatures, i.e. below the casting temperatures of ferrous metals. The cores and molds of this invention exhibit the combination of strength and shakeout at the casting temperatures of lightweight metals such as aluminum and magnesium.

It has been found that an isocyanato urethane polymer which is the reaction product of a polyhydroxy compound and a polyisocyanate can be combined with a polyol to produce a no bake or a cold box urethane binder which, upon mixing with sand or other suitable foundry aggregates and curing, forms cores and molds possessing excellent working characteristics, i.e. strength, abrasion resistance and non-friability. These properties are coupled with excellent shakeout characteristics when used in casting non-ferrous metals. This combination of good working characteristics and excellent shakeout are especially significant and unique when the binder is used to make cores intended for use in low temperature casting. A catalyst may be used to harden the components of the binder system. In a cold box process of making cores and molds suitable catalysts are gaseous tertiary amines or amines that can be introduced as a vapor. Trimethylamine, dimethylethylamine, and triethylamine are preferred catalysts. A catalyst, including known urethane catalysts, is also used as a component of the no bake binder system.

DETAILED DESCRIPTION OF THE INVENTION

The resin compositions of the present invention find use as a two-part composition or system. Part one is a polyol. Part two is an isocyanato urethane polymer, a specific type of polyisocyanate compound. Both parts are in liquid form and are generally solutions with organic solvents. At the time of use, that is to say, when the urethane binder is formed, the polyol part and the isocyanato urethane polymer part are combined and used for the intended application. In foundry no bake application, i.e. the use of the compositions as a binder for cores and molds, it is preferred to first admix one part with a foundry aggregate such as sand. Thereafter, the second component is added and after achieving a uniform distribution of binder on the aggregate, the resulting foundry mix is formed or shaped into the desired shape.

Liquid amine catalysts and metallic catalysts known in urethane technology are employed in the no bake version. By selection of a proper catalyst, conditions of the core making process, for example work time and strip time, can be adjusted as desired.

Gaseous amine catalysts known in cold box technology may also be employed. The actual curing step can be accomplished by suspending a tertiary amine in an inert gas stream and passing the gas stream containing the tertiary amine, under sufficient pressure to penetrate the molded shape, through the mold until the resin has been cured. The binder compositions of the present invention require exceedingly short curing times to achieve acceptable tensile strengths, an attribute of extreme commercial importance. Optimum curing times are readily established experimentally. Since only catalytic concentrations of the tertiary amine are necessary to cause curing, a very dilute stream is generally sufficient to accomplish the curing. However, excess concentrations of the teritary amine beyond that necessary to cause curing are not deleterious to the resulting cured product. Inert gas streams, e.g., air, carbon dioxide or nitrogen, containing from 0.01 to 20% by volume of tertiary amine can be employed. Normally gaseous tertiary amines can be passed through the mold as such or in dilute form. Suitable tertiary amines are gaseous tertiary amines such as trimethylamine. However, normally liquid tertiary amines such as triethylamine are equally suitable in volatile form or if suspended in a gaseous medium and then passed through the mold. Although ammonia, primary amines and secondary amines exhibit some activity in causing a room temperature reaction, they are considerably inferior to the tertiary amines. Functionally, substituted amines such as dimethylethanolamine are included within the scope of tertiary amines and can be employed as curing agents. Functional groups which do not interfere in the action of the tertiary amine are hydroxyl groups, alkoxy groups, amino and alkylamine groups, ketoxy groups, thio groups, and the like.

The isocyanato urethane polymers used to form the urethane binder compositions of this invention are normally produced in a urethane reaction as the reaction product of a polyhydroxy compound and a polyisocyanate. When the term "isocyanato urethane polymer" is use herein it is meant to identify such reaction products but it is not limited specifically to such means of synthesis. Isocyanato urethane polymers are known in the prior art and are at times referred to in the literature as prepolymers or adducts.

Known urethane foundry binders, both of the no bake and of the cold box type, are formed by reacting a polyol and a polyisocyanate. The binder described in this invention is also formed by reacting a polyol with a polyisocyanate. The polyisocyanate component is of a special type which, as previously mentioned, is referred to as an isocyanato urethane polymer. This type of isocyanate is formed by reacting an isocyanate and a polyhydroxy compound to form a urethane compound which contains unreacted isocyanate groups. This reaction "caps" the OH groups of the polyhydroxy compound and leaves free isocyanate groups in the reaction product. These free isocyanate groups are, of course, available for reaction with OH groups present in a polyol.

The reaction described in the preceding paragraph can be represented by the general formula which is described below:

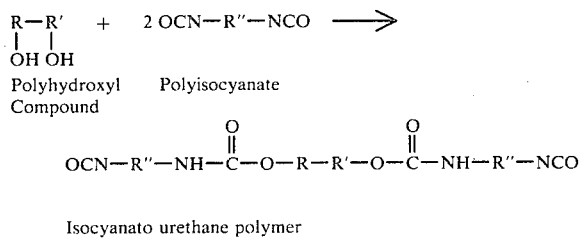

Isocyanato urethane polymer

As has been mentioned above, the most important and unexpected feature of the foundry binder of this invention is its ability to form foundry cores and molds which shake out or readily collapse from lightweight metal castings. The problem of shake out of cores from such castings has long been a problem. It appears that in order for a binder to form cores and molds which provide good collapsibility, the binder must have incorporated therein certain molecular structures which because of their bond strength act as weak links thereby enabling easy breakdown. It is believed that the reason that the isocyanato urethane polymers described in this invention are able to form readily collapsible cores and molds in the presence of certain thermally unstable molecular structures or bonds in the binder. The formation of isocyanato urethane polymers and their use as a component of a foundry binder composition results in the introduction of certain of these thermally unstable groups, for example, $CH_2$ groups and —O—(ether), into the binder composition. Polyisocyantes commonly used to form urethane foundry binders, both of the no bake and cold box type, contain groups of higher cohesive energy than the groups which are introduced into the isocyanato urethane polymer described herein.

Based upon the above theories, it can be appreciated that the polyhydroxy compound which is used as a reactant in the formation of an isocyanato urethane polymer compound of the foundry binder should contain or lead to the formation of an isocyanato urethane polymer having in the polymer backbone a thermally unstable structural unit. Polyhydroxy compounds which have found to be useful, because they include such unstable units, include glycols, glycerols, carbohydrates, polyester polyols, polyether polyols, amine based polyols, diols, triols, vinyl or acrylic polymers with hydroxy functionality and the like. Shake out studies, described in detail in the Examples, which follow, confirm the ability of binders which incorporate isocyanato urethane polymers as a component thereof to break down at the casting temperature of lightweight metals. Thermogravimetric analysis and retained compressive strength are further tests which have been used and which indicate the relative degree binder breakdown.

Among the preferred polyols are glycerine and diethylene glycol. It will be appreciated by those skilled in the art that the feasibility of using certain of isocyanato urethane polymers formed by reacting the abovementioned polyhydroxy compounds will depend upon proper stabilization of the polymer, i.e. maintaining the polymer as a solution. Further, there is likely a practical limitation on the selection of polyhdroxy compound. Increasing molecular weight of the polyhdroxy compound results in higher polymer viscosity. Since the polymer is used to coat sand and since a uniform coating of the sand is sought a readily flowable material is preferred.

The polyisocyanate which is reacted with the above described polyhydroxy compounds to form the isocyanato urethane polymers described herein must be present in such quantities in relation to the number of hydroxyl groups of the polyol as to enable at least one isocyanate group to remain unreacted while capping all of the OH groups present in the polyhydroxy compound. A wide variety of polyisocyanates could be used. Examples of such polyisocyanates include diphenylmethene diisocyanate, methylene-bis-(cyclohexylisocyanate) and isophorone diisocyanate. However, it is extremely preferable to use tolylene diisocyanate, referred to hereafter as TDI. TDI owes its preferred status to the fact that the two isocyanate groups of the compound are not equally reactive. Therefore, one of the isocyanate groups is much more prone to react with a hydroxyl group of the polyol than is the other isocyanate group. The selective reactivity of the isocyante groups of TDI enables the production of an isocyanato urethane polymer of rather well defined structure. As can be appreciated, where the isocyanate groups are not selectively reactive, the resulting isocyanato urethane polymer may have a less definite structure because of the potential for cross linking, which although capable of use, is not preferred. Isophorene diisocyanate also has the above described selective reactivity and is a preferred polyisocyanate.

Outlined below are two reactions which illustrate certain preferred preparations of the isocyanato urethane polymers described in this invention.

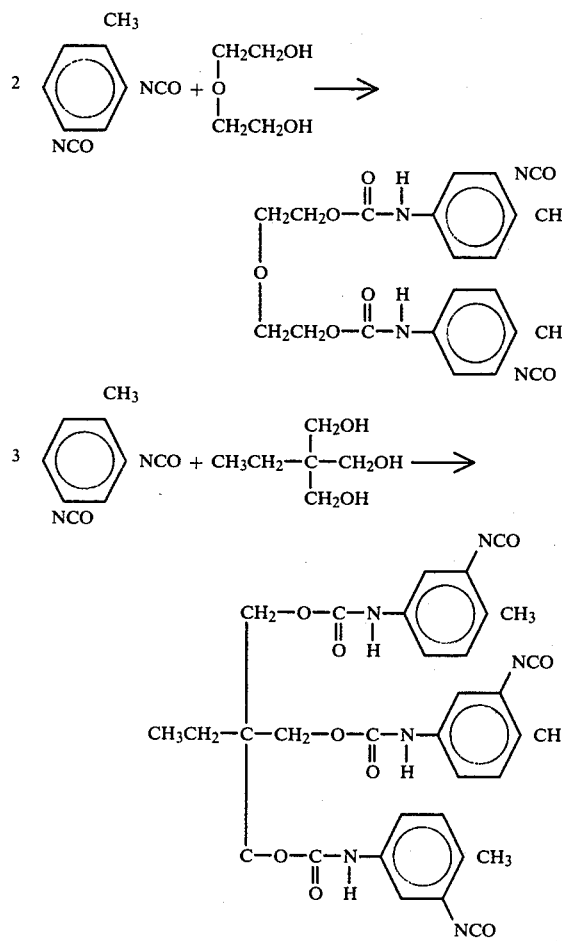

As mentioned above, it is important to select the quantities or mole ratios of the reactants which form the isocyanato urethane polymer so that all OH groups are capped and free isocyanate groups remain when the polymer is formed. Those skilled in the art will recognize the proper mole rations required in order to cap OH groups and to obtain unreacted isocyanate groups in the isocyanato urethane polymer.

The reaction conditions for producing the isocyanato urethane polymers are known. Preferably, when the polymer is intended for use as a foundry binder, the reaction is carried out in a reaction medium at slightly elevated temperature (40°–45° C.) in the presence of a urethane catalyst. After the polymer is prepared it may be useful to strip the reaction medium using a vacuum to remove solvent and catalysts. Certain isocyanato urethane polymers are available commercially.

The polyol component utilized in forming the binder composition may be any polyol known to be useful in foundry mold making and the core-making processes. Especially preferred are those polyols known as PEP Resins described in U.S. Pat. No. 3,485,797. Other phenolic polyols are also useful. Polyether polyols and amine polyols also appear to have utility. Since the isocyanato urethane polymer is responsible for the shake out characteristics of the binder there is no theoretical disadvantage to the type of polyol used in the formation of the foundry binder.

It has been found that blending or mixing one polyol with another polyol can be useful. Once again it is preferred to use hydroxy containing phenolic resins of U.S. Pat. No. 3,485,797 known in the foundry industry as PEP resins, as a part of such blend or mixture.

The second component or package of the novel binder composition comprises the isocyanato urethane polymers heretofore described.

The isocyanato urethane polymer, which can be thought of as the polyisocyanate component, is generally employed in approximately a stoichiometric amount, that is in sufficient concentration to completely react with the polyol component. However, it is possible to deviate from this amount within limits and in some case advantages may result. The isocyanato urethane polymer is employed in the form of an organic solvent solution, the solvent being present in a range of up to 80% by weight of the solution depending upon the isocyanato urethane polymer. In certain cases the reaction medium used in preparing the isocyanato urethane polymer can serve as all or part of the solvent.

Although the solvent employed in combination with either the polyol or the isocyanato urethane polymer or for both components does not enter to any significant degree into the reaction between the isocyanato urethane polymer and the polyol, it can affect the reaction. Thus the difference in the polarity between the isocyanato urethane polymer and the polyol restricts the choice of solvents in which both components are compatible. Such compatability is necessary to achieve complete reaction and curing of the binder compositions of the present invention. Polar solvents are good solvents for the polyol. It is therefore preferred to employ solvents or combinations of solvents where the solvent(s) for the polyol and for the isocyanato urethane polymer when mixed are compatible. In addition to compatibility the solvents for either the polyol or isocyanato urethane polymer are selected to provide low viscosity, low odor, high boiling point and inertness. Examples of such solvents are benzene, toluene, xylene, ethylbenzene, and mixtures thereof. Preferred aromatic solvents are solvents and mixtures thereof that have a high aromatic content and a boiling point range within a range of 280° to 725° F. The polar solvents should not be extremely polar such as to become incompatible when used in combination with the aromatic solvent. Suitable polar solvents are generally those which have been classified in the art as coupling solvents and include furfural, Cellosolve acetate, glycol diacetate, butyl Cellosolve acetate, isophorone and the like. Some relative polyols may also be used as a solvent.

Silanes having the general formula:

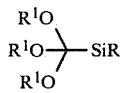

Wherein $R^1$ is a hydrocarbon radical and preferably an alkyl radical of 1 to 6 carbon atoms and R is an alkyd radical, an alkoxy-substituted alkyl radical, or an alkylamino substituted alkyl radical, in which the alkyl groups have from 1 to 6 carbon atoms, have potential value as additives to this binder composition.

The binder components are combined and then admixed with sand or a similar foundry aggregate to form the foundry mix or the foundry mix can also be formed by sequentially admixing the components with the aggregate. Methods of distributing the binder on the aggregate particles are well known to those skilled in the art. The foundry mix can, optionally, contain other ingredients such as iron oxide, ground flax fibers, wood cereals, pitch, refractory flours, and the like. The aggregate, e.g. sand, is usually the major constituent and the binder portion constitutes a relatively minor amount. Although the sand employed is preferably dry sand, some moisture can be tolerated.

As previously stated the excellent shakeout or collapsibility of cores made using the binder of this invention is deemed to be a significant and unexpected discovery. The binders of this invention degrade or break down easily to permit separation of the core from the cast metal. For castings at low temperatures, e.g. 1800° F. or below, shakeout has been a major problem. Generally non-ferrous metals including aluminum and magnesium are cast at these temperatures. Failure of the binder to break down causes great difficulty in removal of the sand from the casting. Thus, cores exhibiting a low degree of shakeout or collapsibility, that is to say a low degree of binder degradation, require more time and energy to remove the sand from the casting. The use of the binder compositions of this invention results, in some instances, of virtually 100% shakeout without the application of any external energy. However, in most commercial applications external energy will be helpful or necessary. The amount of energy, however, will be significantly less than the energy now required to remove cores, bonded with state of the art binders, from lightweight metal castings. The improvement in shakeout is attributable to the presence of the isocyanato urethane polymer in the binder composition. As will be appreciated by those skilled in the art, the ability of any core to shakeout is dependent to an extent upon the amount of binder used to bond the sand particles into a coherent shape.

The percent binder utilized, based on the weight of the sand, depends upon the desired core properties which are required from the binder system. As can be appreciated, as the amount of binder in the sytem increases an increase in the tensile strength of the core generally occurs. Accordingly, the binder level may be varied within reasonable limits to achieve the desired performance properties. A preferred range of binder is, in this invention, from 0.7% to 2.5% based upon the weight of sand. However, it may be possible to use as little as 0.5% and as much as 10% binder and still achieve properties which are of advantage in certain applications. However, it has also been noted that when the binder level is increased the degree of shakeout may decrease at the higher binder levels.

The degree of shakeout has also been found to be related to the temperature to which the binder is exposed. It appears that the binder must be exposed to a certain temperature in order for the binder to weaken and for shake out to result. The higher the casting temperature the more likely it is that the shake out will increase. It should be noted that the thickness of the core or mold will be a factor controlling the temperature to which the binder is exposed. For example, with a very thick core the interior of the core may not be exposed to sufficient temperature to allow the binder to break down and to allow shake out to result.

The present invention is further illustrated by the following examples in which, unless otherwise indicated, all parts are by weight and all percentages are weight percentage.

EXAMPLE I

An isocyanato urethane polymer was prepared by reacting the equivalent of 1 mole of glycerine with the equivalent of 2.9 moles of tolylene diisocyanate. The NCO/OH equivalence ratio is 1.95 to 1. The TDI was 80% 2,4 isomer and 20% 2,6 isomer. Dibutyltin dilaurate was used to catalyze the reaction. Based on TDI 0.07% catalyst was used. The reaction was carried out in a reaction medium consisting of Cellosolve acetate. In carrying out the reaction a mixture of TDI, solvent and catalyst is charged to a reaction vessel. The polyol is added to this mixture. The reaction proceeded at 50° C. for 3 hours and 15 min. and then the temperature was raised to 80°–85° C. and the reaction was continued 3 hours. The product was allowed to cool. The product was tested for nonvolatiles and 59.8% were found. This corresponded to a theoretical amount of nonvolatiles of 60%. The viscosity of the product was 6.6 stokes. The solution is ready for use as a foundry binder to prepare cores and molds. This solution is referred to as Part II. A polyol solution, based on a phenolic resin, commercially available from Ashland Chemical Company was used. This polyol solution is available under the brand ISOCURE ® 308. The polyol solution is referred to as Part I. A near stoichiometric amount of Part II to completely react with the hydroxyl groups of the polyol was used.

Wedron 5010 sand (washed and dryed fine grained silica sand, AFSGFN 66) was placed in a suitable mixing apparatus. Part I was admixed with the sand until a uniform coating was provided. Part II was added to the coated sand and blended until a homogenous sand mix was prepared. Two percent (2%) of total binder (equal amounts of Part I and Part II) by weight of sand was used.

The mix of sand, polyol and isocyanato urethane polymer was blown into a conventional core cavity or box for making standard tensile briquettes test cores known as "dog bones". The dog bone test cores were cured by exposing the cores to a tertiary amine catalyst. The amine catalyst, dimethylethylamine, was suspended in carbon dioxide, an inert carrier gas. The cores were exposed to the amine catalyst for approximately 1 second (gas time) and the amine catalyst was removed by purging with air for 4 seconds and removed from the box. Tensile strengths in psi were 40 out of the box, 118 after one hour, and 145 after 3 hours and 180 after standing overnight (approximately 24 hours).

The "dog bone" cores were used in shakeout studies with aluminum castings. Seven tensile briquettes (dog bones) were arranged in a mold. The mold incorporated a gating system. The mold is designed to provide hollow castings having a metal thickness of approximately one-quarter inch on all sides. An opening at an end of the casting is provided for removal of the core from the casting. Molten aluminum at approximately 1300° F. prepared from aluminum ingots was poured into the mold. After cooling for about an hour the aluminum castings are broken from the gating system and removed from the mold for shakeout testing.

Shakeout tests are performed by placing a casting in a one gallon container. The container is placed on an agitating mechanism and tumbled for 5 minutes. The weight of the sand core which is removed from the casting in this manner is compared to the initial weight of sand core and a percent shakeout is calculated. Sand remaining in the casting after the agitation described above is removed by scraping and also weighed. The sand core, bonded with the polyol, isocyanato urethane polymer binder described above, was observed to have 11% shakeout. It should be noted that the shakeout test above described is not a standard test. Applicants are not aware of any standard test to measure this quality. It is submitted that the test used is valid for gaining an understanding of the collapsibility of a binder and for comparing the relative collapsibility of binders. The percents given are subject to a degree of variance but are reliable indicators.

EXAMPLES 2-9

Using the procedures described in Example I test cores were prepared and tested with aluminum castings using the components and methods listed and described below:

| Example | 2 | 3 | 4 | 5 |
|---|---|---|---|---|
| Sand | Wedron 5010 | Wedron 5010 | Wedron 5010 Mondur CB60[B] | Wedron 5010 |
| Isocyanato Urethane Polymer (Part II) | | | | |
| (a) polyhydroxy compound | Glycerine | diethylene glycol | — | PLURACOL[C] TP 340 |
| (b) polyisocyanato | TDI | TDI | — | TDI |
| (c) ratio NCO/OH | 1.95 | 1.95 | — | 1.95 |
| (d) catalyst, wt% based on TDI | dibutyltin dilaurate 0.07 | dibutyltin dilaurate 0.07 | — | dibutyltin |
| (e) reaction medium | HI SOL® 10 (42%) CELLOSOLVE ACETATE (58%) | HI SOL 10 (77%) CELLOSOLVE ACETATE (23%) | — | HI SOL 10 (80%) CELLOSOLVE ACETATE (20%) |
| (f) temp/time °C./hrs | 55-50° for 3.2 80-85° for 3.25 | 50° for 3.25 80-85° for 3 | — | 50-55° for 3.6 80-82° for 3.4 |
| (g) viscosity, stokes | 6.6 | 3.4 | — | 19 |
| (h) % nonvolatiles | | | | |
| Actual | 59.8 | 67 | — | 65 |
| Theoretical | 60 | 65 | | 65 |
| Polyol (Part I) | PEP SET® 1505[A] | PEP SET 1505 | ISOCURE 308 | PEP SET 1505 |
| Ratio:Part I/Part II | | 1/1.1 | 1/1 | 1/1.1 |
| Solvent-Polymer | — | — | — | — |
| Solvent-Polyol | — | — | — | — |
| Catalyst | DMEA | DMEA | DMEA | DMEA |
| Gas Time/sec | 2 | 2 | 1 | 2 |
| Purge Time/sec | 4 | 4 | 4 | 4 |
| Dwell Time | 0 | 0 | 0 | 0 |
| Tensile Strength, psi | | | | |
| Out of Box | 83 | 123 | 62 | 23 |
| 1 hr. | 172 | 308 | 158 | 107 |
| 3 hr. | 212 | 337 | 177 | 115 |
| 24 hr.(overnight) | 237 | 328 | 188 | 138 |
| Total Binder % | 2 | 2 | 2 | 1.5 |
| Shake Out % | 89 | 45 | 11 | 100 |

| Example | 6 | 7 | 8 | 9 |
|---|---|---|---|---|
| Sand | Wedron 5010 | Wedron 5010 | Port Cresent | Wedron 5010 |
| Isocyanato Urethane Polymer (Part II) | MONDUR CB60 | Cargill 4505[D] | | |
| (a) polyhydroxy compound | — | — | Glycerine diethylene | diethylene glycol |
| (b) polyisocyanate | — | — | TDI | TDI |
| (c) Ratio NCO/OH | — | — | 1.95 | 1.95 |
| (d) Catalyst | — | — | dibutyltin dilaurate 0.08 | dibutyltin dilaurate 0.07 |
| (e) reaction medium | — | — | CELLOSOLVE ACETATE | HI SOL 10 (77%) CELLOSOLVE ACETATE (23%) |
| (f) temp/time °C./hrs. | — | — | 40-45° for 3.4 80 for 3.5 | 50° for 3.25 80-85° for 3 |
| (g) viscosity | — | — | 5.6 | 3.4 |
| (h) % nonvolatiles | | | | |
| Actual | — | — | 59.3 | |
| Theoretical | — | — | 60 | |
| Polyol (Part I) | A phenolic resin of the novolak type | PEP SET 1505 | PEP SET 1505 | Bisphenol A |
| Ratio:Part I/Part II | 1/1.1 | 1.2/1.0 | 1.2/1.0 | 1/1.1 |

|                     |       |                |                |                  |
| ------------------- | ----- | -------------- | -------------- | ---------------- |
| Solvent-Polymer     | —     | —              | see below fn$^E$ |                |
| Solvent-Polyol      | —     | LINSEED OIL 4% | LINSEED OIL 4% | ISOPHORONE (60%) |
| Catalyst            | DMEA  | DMEA           | DMEA           | DMEA             |
| Gas Time/sec        | 2     | 5              | 2              | 5                |
| Purge Time/sec      | 4     | 4              | 4              | 4                |
| Dwell Time          | 0     | 30             | 0              | 120              |
| Tensile Strength, psi |     |                |                |                  |
| Out of Box          | 32    | 16             | 102            | —                |
| 1 hr.               | 100   | 50             | 232            | 5                |
| 3 hr.               | 97    | 68             | —              | —                |
| 24 hr. (overnight)  | 130   | 302            | 255            | 237              |
| Total Binder %      | 1.5   | 1.5            | 1.5            | 1.5              |
| Shake Out %         | 100   | 100            | 100            | 100              |

$^A$A brand of commercially available polyol solution, based upon a phenolic resin, available from Ashland Chemical Company
$^B$A brand of commercially available isocyanato urethane polymer believed to be an adduct of TDI and trimethylol propane dissolved in ethylglycol acetate and xylene (25:15) available from Mobay Chemical Company.
$^C$A brand of commercially available polyether polyol based upon propylene oxide and trimethylol propane available from Wyandotte Chemical Company.
$^D$A brand of commercially available isocyanato urethane polymer believed to be an adduct of isophorone diisocyanate and trimethylol propane of 40% solvent consisting of methylisoamyl ketone, methylethyl ketone, Cellosolve acetate and xylene available from Cargill.
$^E$Polymer Vacuum stripped to remove portion of Cellosolve acetate, addd HI SOL 10 to make 40% solution consisting of 66% HI SOL 10 and 34% Cellsolve

EXAMPLE 10

An isocyanato urethane polymer was prepared by reacting the equivalent of 1 mole of glycerine with the equivalent of 2.9 moles of tolylene diisocyanate. The NCO to OH equivalence is 1.95 to 1.0. The TDI was 80% 2,4 isomer and 20% 2,6 isomer. Dibutyltin dilaurate was used to catalyze the reaction. Based on TDI 0.05% catalyst was used. The reaction was carried out in a reaction medium consisting of Cellolsolve acetate (40%). In carrying out the reaction a mixture of TDI, solvent and catalyst is charged to a reaction vessel. The polyol is added to this mixture. The reaction proceeded at 51°–54° C. for 1.54 hours, then the temperature was raised to 79°–82° C. and the reaction was continued 3.9 hours. The product was allowed to cool. The product was tested for nonvolatiles and 58.4% were found. This corresponded to a theoretical amount of nonvolatiles of 60%. The viscosity of the product was 11.9 stokes. The solution is ready for use as a foundry binder to prepare cores and molds. This solution is referred to as Part II. A polyol solution, based on a phenolic resin, commercially available from Ashland Chemical Company is used. This polyol is available under the brand PEP SET ® 1505. The polyol solution is referred to as Part I.

No bake cores were prepared from the above described Part I and Part II components as follows. Wedron 5010 sand (washed and dried, fine grained silica sand, AFSGFN 66) was placed in a suitable mixing apparatus. Part I and catalyst (0.5% n-methyl imidizole based on weight of Part I) were admixed with the sand until a uniform coating was provided. Part II was added to the coated sand and blended until a homogeneous sand mix was prepared. A near, stoichiometric amount, slightly excessive, of polyisocyanate, to completely react with the hydroxyl groups of the polyol was used. Two percent (2%) of total binder (equal amounts of Part I and II) by weight of sand was used.

The mix of sand, polyol and polyisocyanate was placed in a core box and standard tensile briquettes, known as "dog bones", were prepared. A work time of five minutes and a strip time of six minutes was achieved. Tensile strengths after one hour, three hours and 24 hours (overnight) were 83,145 and 253 psi, respectively.

The "dog bone" cores were used in shakeout studies with aluminum castings. Seven tensile briquettes (dog bones) were arranged in a mold. The mold incorporated a gating system. The mold is designed to provide hollow castings having a metal thickness of approximately one-quarter inch on all sides. An opening at an end of the casting is provided for removal of the core from the casting. Molten aluminum at approximately 1300° F. prepared from aluminum ingots was poured into the mold. After cooling for about an hour the aluminum castings are broken from the gating system and removed from the mold for shake out tests.

Shakeout tests are performed by placing a casting in a one gallon container. The container is placed on an agitating mechanism and tumbled for 5 minutes. The weight of the sand core which is removed from the casting in this manner is compared to the initial weight of sand core and a percent shakeout is calculated. Sand remaining in the casting after the agitation described above is removed by scraping and also weighed. The sand core, bonded with the polyol and isocyanato urethane polymer binder described above, was observed to have 77% shakeout.

EXAMPLES 11–13

Using the procedures described in Example 10 test cores were prepared and tested with aluminum castings using the components and method listed and described below:

| Example | 11 | 12 | 13 |
| --- | --- | --- | --- |
| Sand | Wedron 5010 | Wedron 5010 | Wedron 5010 |
| Isocyanato Urethane (Part II) | | MONDUR | MONDUR |
| Polymer | | CB 601$^F$ | CB60 |
| (a) polyhydroxy compound, moles | PLURACOL TP 340 | | |
| (b) polyisocyanate, moles | TDI | | |

-continued

| Example | 11 | 12 | 13 |
|---|---|---|---|
| NCO/OH equiv. | 1.95/1.0 | | |
| (c) catalyst, % based on TDI | dibutylin dilauret 0.05 | | |
| (d) reaction medium | Cellosolve acetate | | |
| (e) temperature/time °C./hrs. | 51-54 for 1.1 hr. 79-82 for 4.8 hr. | | |
| (f) Viscosity/stokes | 69 | | |
| (g) % Nonvolatiles | | | |
| Actual | 58 | | |
| Theoretical | 60 | | |
| Polyol (Part I) | PEP SET 1505 | PEP SET 1505 | PEP SET 1505 |
| Solvent-Polyol | | | |
| Solvent Polymer | | | |
| Catalyst-% based on | 0.5 N-methyl-imidizole | 0.5 N-methyl-imidizole | 0.5 N-methyl-imidizole |
| Part I | 0.25 PPP$^G$ | 0.25 PPP | 0.25 PPP |
| Work Time/min. | 10 | 8 | 5.5 |
| Strip Time/min. | 16 | 10 | 7 |
| Tensile Strength,psi | | | |
| 1 hr. | 20 | 57 | 117 |
| 3 hr. | 35 | 102 | 202 |
| 24 hr. (overnight) | 213 | 148 | 275 |
| Total Binder % | 1.5 | 1.5 | 2 |
| Shake Out % | 92% | 100 | 72 |

$^F$A brand of commercially available isocyanato urethane polymer believed to be an adduct of TDI and trimethylol propane dissolved in ethylglycol acetate available from Wyandotte Chemical Company.
$^G$phenyl propyl pyridine

What is claimed is:

1. A binder composition useful for making shaped foundry articles for use in casting lightweight metals, which articles collapse after casting of said lightweight metals, comprising in admixture a polyol component, an isocyanate component comprising an isocyanato urethane polymer wherein all hydroxy groups of said polymer are capped and a curing agent.

2. The binder composition of claim 1 wherein the polyol component comprises a phenolic resin having the general formula:

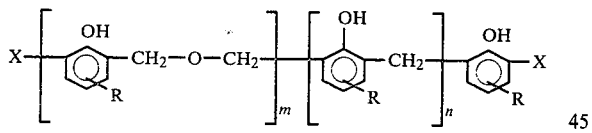

G. phenyl propyl pyridine wherein R is hydrogen or a phenolic substitute meta to the hydroxyl group of the phenol, M and N are numbers the sum of which is at least 2, and the ratio of M to N is at least 1, and X is a hydrogen or a methylol group, the molar ratio of said methylol group to hydrogen being at least 1.

3. The binder composition of claim 2 wherein the isocyanato urethane polymer is the reaction product of a polyhydroxy compound and a polyisocyanate, wherein the molar equivalent of NCO groups of said polyisocyanate exceeds the molar equivalent of OH groups of said polyhydroxy compound.

4. The binder composition of claim 3 wherein the polyisocyanate component comprises tolylene diisocyante.

5. The binder composition of claim 3 wherein the polyhydroxy compound comprises glycerine.

6. The binder composition of claim 3 wherein the polyhydroxy compound comprises diethylene glycol.

7. The binder composition of claim 3 wherein the polyhydroxy compound comprises trimethylol propane.

8. The binder composition of claim 1 wherein the curing agent comprises a urethane catalyst.

9. The binder composition of claim 1 wherein the curing agent comprises a tertiary amine which is gaseous at room temperature.

10. Process of forming shaped foundry articles for use in casting lightweight metals, which articles collapse after casting of said lightweight metals, comprising:
  (a) Forming a foundry mix by distributing on an aggregate a binding amount of up to 10%, based upon the weight of the aggregate, of a binder composition, said composition comprising in admixture a polyol component and an isocyanate component, said isocyanate component comprising an isocyanato urethane polymer wherein all hydroxy groups of said polymer are capped.
  (b) Shaping the foundry mix into a desired foundry article; and
  (c) Contacting the shaped foundry mix with a tertiary amine which is gaseous at room temperature until the binder has cured.

11. The process of claim 10 wherein the isocyanato urethane polymer is the reaction product of a polyhydroxy compound and a polyisocyanate, wherein the molar equivalent of NCO groups of said polyisocyanate exceeds the molar equivalent of OH groups of said polyhydroxy compound.

12. The process of claim 11 wherein the polyisocyanate component comprises tolylene diisocyanate.

13. The process of claim 11 wherein the polyhydroxy compound comprises glycerine.

14. The process of claim 11 wherein the polyhydroxy compound comprises diethylene glycol.

15. The process of claim 11 wherein the polyhydroxy compound comprises trimethylol propane.

16. The process of claim 11 wherein the polyol component comprises a phenolic resin having the general formula:

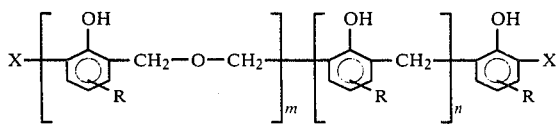

wherein R is hydrogen or a phenolic substitute meta to the hydroxyl group of the phenol, M and N are numbers the sum of which is at least 2, and the ratio of M to N is at least 1, and X is a hydrogen or a methylol group, the molar ratio of said methylol group to hydrogen being at least 1.

17. Process of forming shaped foundry articles for use in casting lightweight metals, which articles collapse after casting of said lightweight metals, comprising:
(a) Forming a foundry mix by distributing on an aggregate a binding amount of up to 10%, based upon the weight of the aggregate, of a binder composition, said composition comprising in admixture a polyol component and an isocyanate component, and a curing agent, said isocyanate component comprising an isocyanato urethane polymer wherein all hydroxy groups of said polymer are capped.
(b) Shaping the foundry mix into a desired foundry article; and
(c) Allowing the article to cure.

18. The process of claim 17 wherein the isocyanato urethane polymer is the reaction product of a polyhydroxy compound and a polyisocyanate, wherein the molar equivalent of NCO groups of said polyisocyanate exceeds the molar equivalent of OH groups of said polyhydroxy compound.

19. The process of claim 18 wherein the polyisocyanate component comprises tolylene diisocyanate.

20. The process of claim 18 wherein the polyhydroxy compound comprises glycerine.

21. The process of claim 18 wherein the polyhydroxy compound comprises diethylene glycol.

22. The process of claim 18 wherein the polyhydroxy compound comprises trimethylol propane.

23. The process of claim 18 wherein the polyol component comprises a phenolic resin having the general formula:

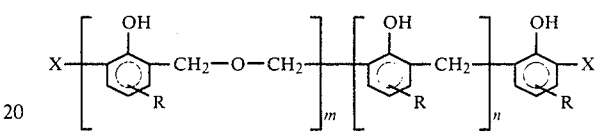

wherein R is hydrogen or a phenolic substitute meta to the hydroxyl group of the phenol, M and N are numbers the sum of which is at least 2, and the ratio of M to N is at least 1, and X is a hydrogen or a methylol group, the molar ratio of said methylol group to hydrogen being at least 1.

24. The process of claim 17 wherein the curing agent is a urethane catalyst.

* * * * *